UNITED STATES PATENT OFFICE.

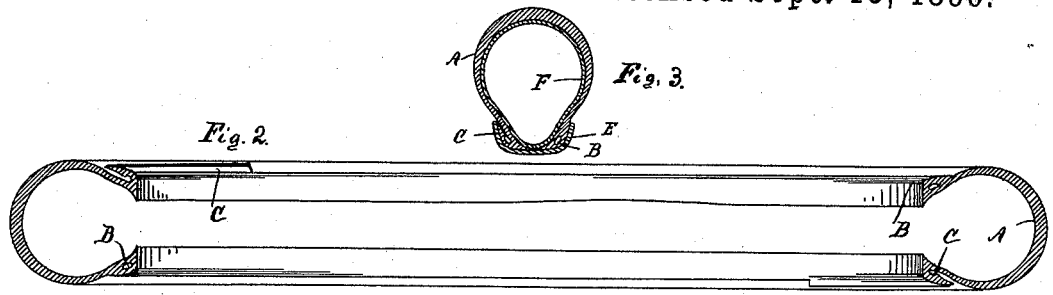
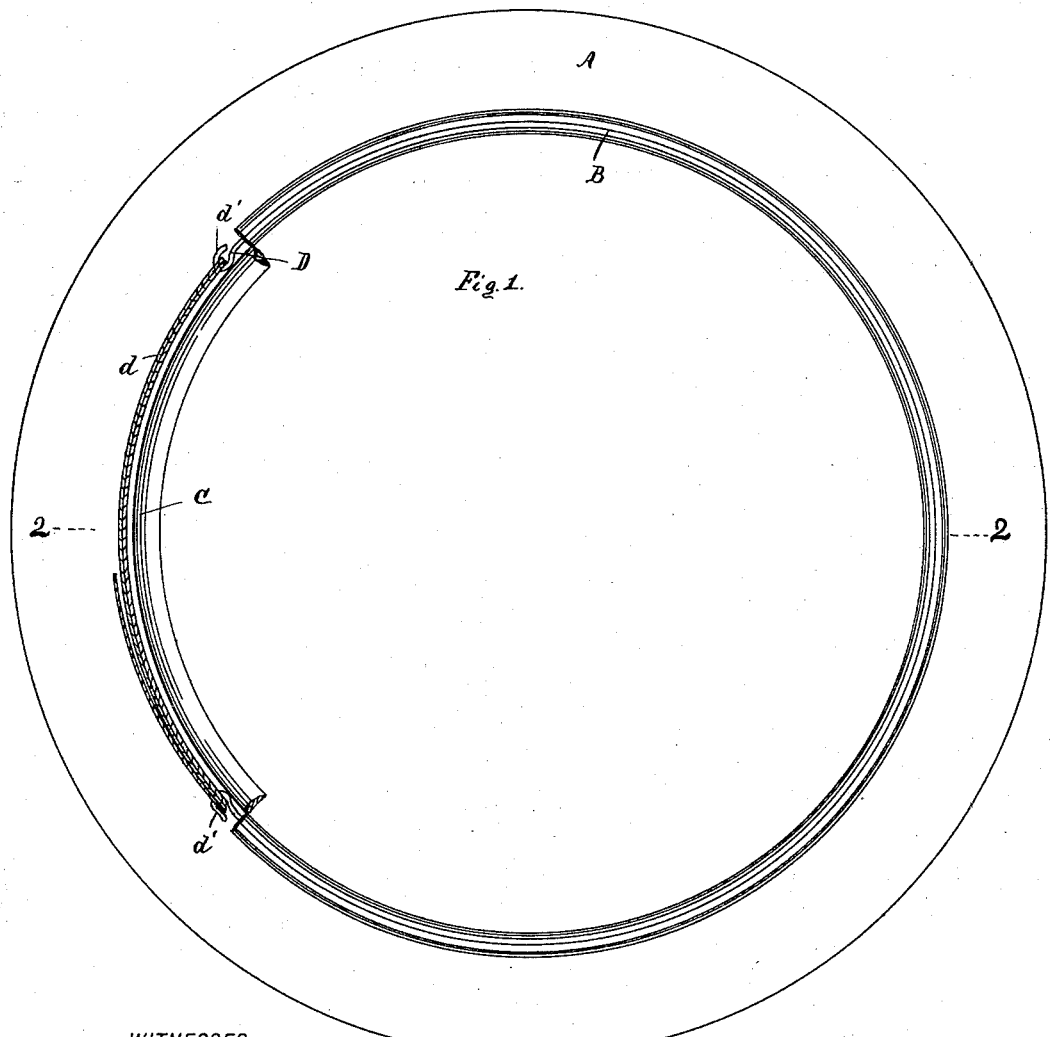

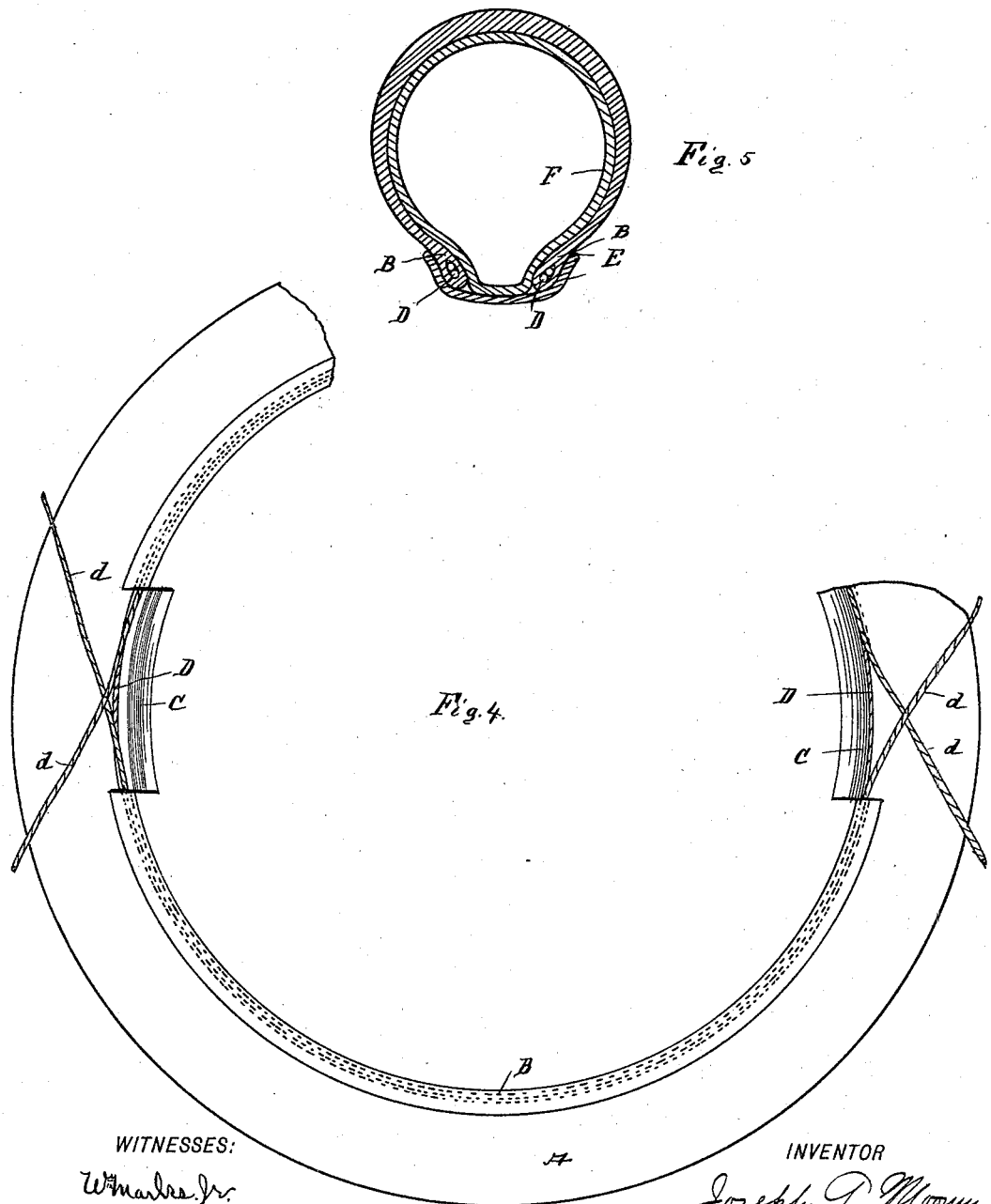

JOSEPH G. MOOMY, OF ERIE, PENNSYLVANIA, ASSIGNOR OF ONE-HALF TO THE COMBINATION ROLL AND RUBBER COMPANY, OF BLOOMFIELD, NEW JERSEY.

PNEUMATIC TIRE.

SPECIFICATION forming part of Letters Patent No. 567,839, dated September 15, 1896.

Application filed October 26, 1895. Serial No. 566,955. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires; and it consists in certain improvements in the construction thereof, as will be hereinafter fully described, and pointed out in the claims.

The invention is illustrated in the accompanying drawings, as follows:

Figure 1 shows a side elevation of the tire. Fig. 2 shows a section on the line 2 2 in Fig. 1. Fig. 3 shows a cross-section of the tire on a suitable rim. Fig. 4 shows a modification of the tire shown in Fig. 1. Fig. 5 shows a cross-section of the tire shown in Fig. 4.

As shown, the tire belongs to the class known as the "double-tube detachable tire." My invention is applicable to other classes of tires. I do not, therefore, wish to be limited to any one class.

The outer casing A is provided on its inner periphery with a closed pocket B, which runs into an open pocket C, the bottom of which forms a binder-recess. A binder D, preferably of wire, is run into the closed pocket and is provided with a fastener, preferably of string, placed in the open pocket. In Fig. 1 the wire binder is provided with hook ends $d'\,d'$, into which the string fastener $d$ is drawn.

The operation of the device is simple. The tire is placed on a rim, as E, with an inclosed inner tube F. The string (an end of which is preferably permanently attached to one of the wires) is passed from one hook to the other and pulled with each wrap. After several wraps are made the end of the string is laid in the pocket. After attaching both sides of the tire in this manner the tire is blown up. As the tire is inflated the pressure against the pockets C closes them over the binder and creates such frictional resistance against the string as to prevent its slipping, and so completes the fastener.

Among the advantages of this construction may be stated: As there is no tendency of the closed pocket pulling out from under the binder it is not necessary to draw the binder as tight as with an open pocket throughout the inner periphery. The closed pocket keeps the binder in place when the tire is removed. The short open pocket gives the advantage in fastening incident to the open pocket, while at the same time a continuous seat is provided for the binder throughout the inner periphery of the casing. The manufacture of the tire is much simpler than with the open pocket throughout the inner periphery.

In the modification shown in Figs. 4 and 5 two pockets are used and two binders are run through the pockets, the ends coming one in each open pocket. Each binder is tightened, and in this manner a more even force is applied to the different parts of the circumference than with a single binder. The number of pockets and binders may be increased if desired.

What I claim as new is—

1. In a pneumatic tire, the combination of the outer casing thereof having a closed pocket and an open pocket on its inner periphery; and a binder running through said closed and open pockets, the said open pocket extending under and engaging said binder and said open and closed pockets forming a continuous seat for said binder throughout the periphery of the said casing.

2. In a pneumatic tire, the combination of the outer casing thereof having a closed pocket and an open pocket on its inner periphery, said open pocket having a binder-recess accessible with the tire deflated and closed with the tire inflated; and a binder running through said closed pocket and upon the seat of the open pocket.

3. In a pneumatic tire, the combination of the outer casing thereof having a closed pocket and an open pocket on its inner periphery, said open pocket having a binder-recess accessible with the tire deflated and closed with the tire inflated; and a fastener for said binder in said open pocket.

4. In a pneumatic tire, the combination of the outer casing thereof having a closed pocket and an open pocket on its inner periphery, said open pocket having a binder-recess accessible with the tire deflated and closed with the tire inflated; a wire binder running through the closed pocket; and a string fastener for said binder in said open pocket.

5. In a pneumatic tire, the combination of the outer casing thereof having a series of closed and open pockets in continuation of each other, said open pockets having a binder-recess accessible with the tire deflated and closed with the tire inflated; a series of binders running through said pockets; and a fastener in each open pocket for a binder.

In testimony whereof I affix my signature in presence of two witnesses.

JOSEPH G. MOOMY.

Witnesses:
  WM. MARKS, Jr.,
  HENRY E. FISH.